United States Patent [19]

Miller

[11] 4,019,464
[45] Apr. 26, 1977

[54] ANIMAL SIZE SORTING AND CONTROL GATE

[76] Inventor: Thomas G. Miller, R.R. 1, Box 88, Burlington, Iowa 52601

[22] Filed: June 7, 1976

[21] Appl. No.: 693,635

[52] U.S. Cl. .............................................. 119/155
[51] Int. Cl.² ..................................... A01K 29/00
[58] Field of Search ....................... 119/155, 98, 99

[56] References Cited

UNITED STATES PATENTS

| | | | |
|---|---|---|---|
| 1,381,796 | 6/1921 | Caspers | 119/155 |
| 1,757,426 | 5/1930 | Haynes | 119/155 |
| 2,969,770 | 1/1961 | Collins | 119/98 |
| 3,797,463 | 3/1974 | McCrery, Jr. | 119/155 |

*Primary Examiner*—Hugh R. Chamblee
*Attorney, Agent, or Firm*—McWilliams & Mann

[57] ABSTRACT

An animal size sorting and control gate for efficient operation in a number of operative modes permitting passage in a single direction, passage in both directions or passage in neither direction. A pair of width limiters, each having a pair of horizontally disposed arms and a vertical rail extending between the arms, are pivotable with respect to horizontally disposed frame members. A plate underlying an upper horizontal frame member has a plurality of apertures arranged in circular arcs about either side of the frame members for alignment with an aperture in one of the arms of the width limiter to selectively fix the operating position of the width limiters by placing a pin through the aligned apertures. A space between the vertical rails of the width limiters determines the maximum size of animals which may pass therethrough. A pair of doors are hingedly connected to a pair of vertical frame members such that the doors span most of the area in the vertical direction between the arms of the width limiters, and in the horizontal direction between the vertical frame members and the vertical rail of the width limiters when the width limiters are pivoted into a generally co-planar relationship with the doors. Door stops along horizontal edges of the doors are positioned to cooperate against stop means on the arms of the width limiters.

12 Claims, 7 Drawing Figures

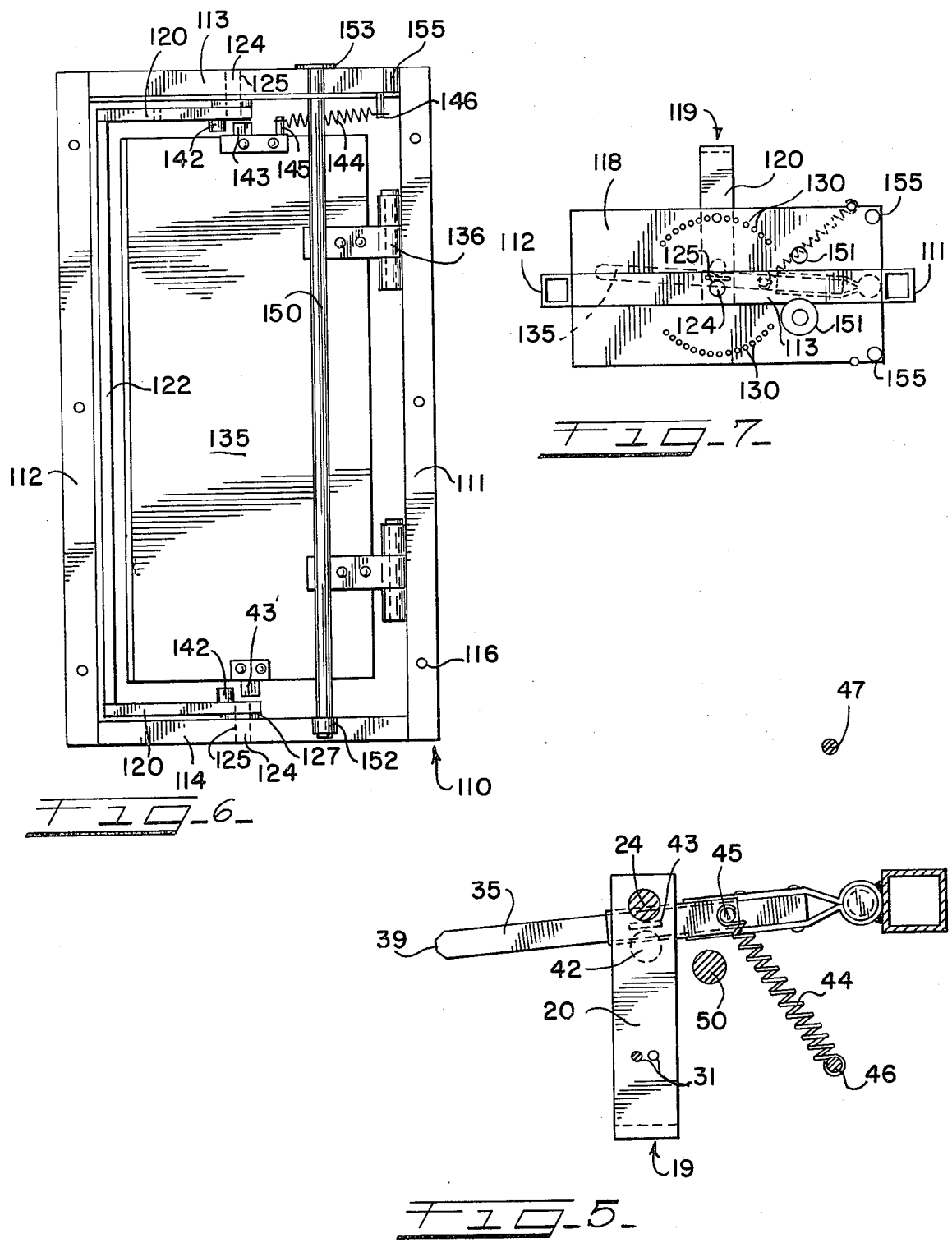

ANIMAL SIZE SORTING AND CONTROL GATE

BACKGROUND OF THE INVENTION

This invention relates in general to apparatus for sorting animals below a predetermined size, and more particularly to a size sorting and control gate which is efficiently and simply operable in a variety of modes.

Various types of gates are known in the prior art for sorting animals below a predetermined size, and which are especially suited for swine. It is known to the prior art, that in many animals, including swine, the width of the animals generally correlates to their weight and to their age. Older animals are generally not marketable as quality stock or as prime meat to the various slaughtering houses. Various gates have been used in prior art in conjunction with buildings, fences or other enclosures to separate the animals below a predetermined size or weight from the balance of the livestock.

One of the main problems with prior art size sorting gates is that the size of the animal is not tested before the animal begins passing through the gate. In some prior art devices a pivoting element allows passage of the animal through the gate and also limits the size of animals therethrough. Animals of a size which are too large to pass through the gate often become pinched by the gate. The pinching phenomenom is caused by the fact that the pivoting element is usually resiliently or gravitationally biased toward the closed position. When the animal realizes that he will not be able to pass through the gate and begins backward movement, the pivoting element tends to remain biased against the animal and moves back toward the closed position as the animal begins to move backward. In some instances, the animal will not be released from the pivoting element of the gate until the operator of the gate is able to release him. Depending on the type of gate, periodic supervision may be required to prevent the loss of stock and to enable the sorting process to resume.

Many of the prior art gates have a structure which permits the sorting process to operate in only one direction. Often the gate is used in installations where size sorting in either direction is desirable. Time-consuming disassembly and reassembly of the apparatus may be required with prior art devices to achieve the reversible operation.

Some prior art devices are further characterized by inefficient use of the area of the gate. Due to the width adjustment means used in the gate, much of the area of the gate may be unusable. The unusable area further adds to the cost, bulkiness and inefficiency of the gate.

SUMMARY OF THE INVENTION

The size sorting and control gate of the present invention utilizes a structure which permits versatile operation of the gate in a variety of modes of operation, tests the size or width of the animals before they pass through the gate, and efficiently utilizes the area of the gate for sorting a wide variety of varying width animals.

A pair of horizontally disposed frame members and a pair of vertically disposed frame members define a generally rectangular frame and an opening therethrough. A pair of width limiters each have a pair of horizontally disposed arms and a vertical rail extending between first ends of the arms. Second ends of the arms are in pivotal relationship with respect to the horizontally disposed frame members. A plate underlies the upper horizontal frame member in proximate relation to each of the width limiters. A plurality of apertures are arranged in circular arcs on either side of the horizontal frame member with the apertures centered about the pivot points of the width limiter. An aperture in each upper arm of the width limiter is alignable with the apertures in the plate, such that a pin or the like may be inserted through the aligned apertures to fix the width limiters in one of a range of operating positions. The width of any animal which may pass through the gate is determined by the spacing between the vertical rails of the width limiters before the animals begin passing through the gate.

A pair of doors are hingedly connected to the vertical frame members and resilient means urges the doors toward the normally closed positions. Stop means on at least one arm of each width limiter is in eccentric relationship to the pivoting means. A door stop along a horizontal edge of the door cooperates against the stop means when the width limiters are in an operating position, but will allow the stop means to pass by the door stops when the width limiters are pivoted to the position where the width limiters are generally co-planar with the doors. The width limiters may then be further pivoted toward an opposite direction thereby reversing the direction of the flow of animals through the gate.

Blocking bars are receivable in the gate on either side of the doors at points between the width limiters and the vertical frame members to prevent passage of animals between a width limiter and a vertical frame member when the width limiters are fixed in a small spacing therebetween. Passage of animals through the gate in either direction may be prevented by placing blocking bars on the sides of the doors opposite to the width limiters thereby retaining the doors in closed positions.

Retaining pins, receivable in tubes generally located near the corners of the plate, may be used to retain the doors in an open position thereby permitting animals of a smaller size than the spacing between the width limiters to pass through the gate in either direction.

A more economic version of the size sorting and control gate, but with less width capacity, has a single door hingedly connected to a first vertical frame member and a single width limiter. The size sorting function is achieved between the width limiter and a second vertical frame member. The single door version has the same variety of operating modes and otherwise operates similarly to the double door version.

BRIEF DESCRIPTION OF THE DRAWINGS

In the drawings:

FIG. 5 is a top, plan view taken in partial section along the section line 5—5 of FIG. 2;

FIG. 6 is an elevational view of a gate with a single door and a single width limiter; and FIG. 7 is a top, plan view of the gate in FIG. 6 but with the width limiter in an operating position.

DESCRIPTION OF THE PREFERRED EMBODIMENTS

Figure 1:
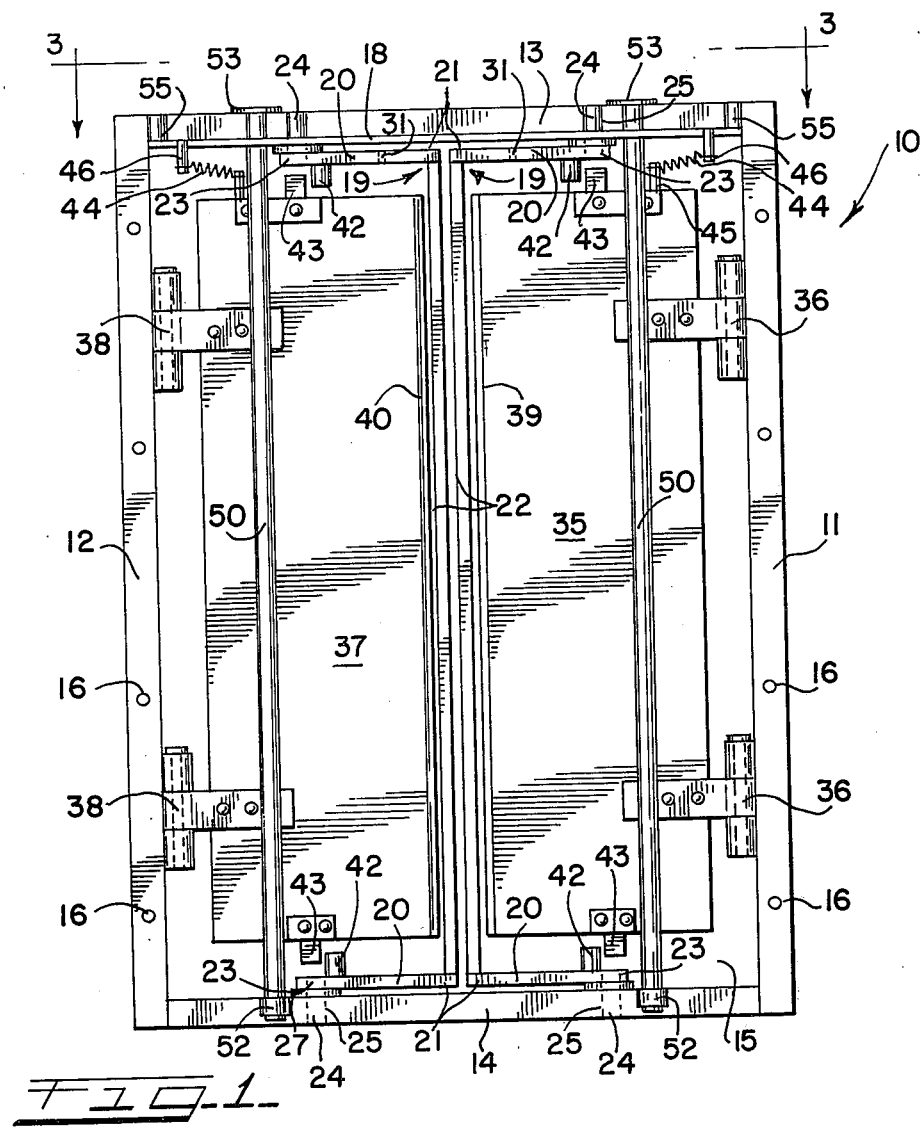
FIG. 1 is a elevational view of the size sorting and control gate according to the present invention with the width limiters in co-planer relationship with the doors.

Size sorting and control gates are used on farms and in livestock yards to control the passage of livestock, including swine, between various enclosures, buildings, or combinations thereof, or to limit the passage of only animals below a predetermined size. It is known that the width of an animal reliably bears correlation to the weight, size and age of the animal. Sorting all the animals into one or more groups of sizes may be desirable for a variety of reasons. It may be desirable to allow only smaller animals continuous access to food and water. When preparing to market the animals, the owner of the livestock is usually faced with different price quotations for different size or weight animals. Various other reasons for allowing passage of animals of a minimum size through the gate, or controlling the mode of passage therethrough, will depend upon the particular application.

Referring to FIGS. 1 through 5, various views of an animal size sorting and control gate, generally designated at 10, are illustrated. A pair of vertically disposed frame members includes a first frame member 11 and a second frame member 12 in a parallel, spaced-apart relationship. A pair of horizontally disposed frame members includes an upper frame member 13 and a lower frame member 14 in a generally parallel, spaced-apart relationship. The ends of the frame members 11, 12, 13, and 14 are connected together, as by welding or other fastening means, to define a generally rectangular frame with a generally rectangular opening 15 therethrough. Various other parts of the gate 10 occupy the opening 15 to control the size and direction of flow of animals therethrough. The significance of these other parts is explained hereinafter.

The vertically disposed frame members 11, 12 may be provided with a plurality of apertures 16 extending transversely through the members 11, 12 for attaching the gate 10 to a building, fence post, or the like, such that the gate 10 controls the passage of animals from one area or enclosure to another. For reasons of cost efficiency and weight reduction, the members 11, 12, 13, 14 are preferably hollow tubing. The tubing is preferably rectangular in cross-section because the flat surfaces of rectangular tubing facilitate or accommodate attachment and cooperation of various other parts of the gate 10 thereto. However, the members 11, 12, 13, 14 could also assume other configurations, including for example, angle iron. The members 11, 12, 13, 14 are fabricated from metal stock, such as iron, aluminum or the like, to lend strength, rigidity, and a long operational life to the gate 10.

Figure 3:
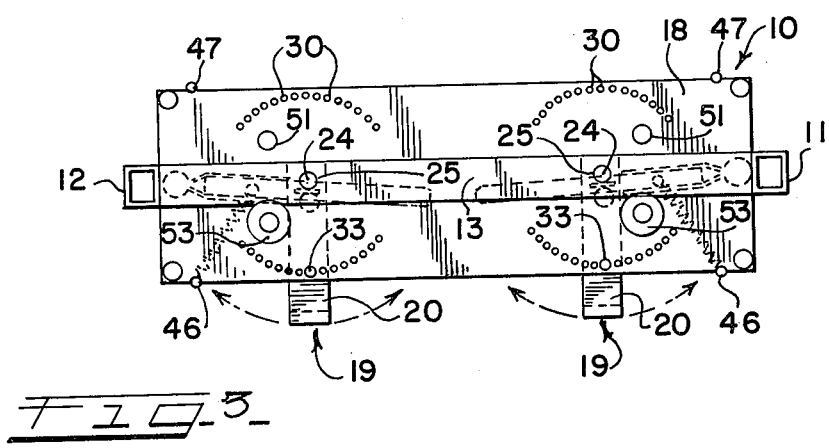
FIG. 3 is a top, plan view of the gate in FIG. 2.
Figure 2:
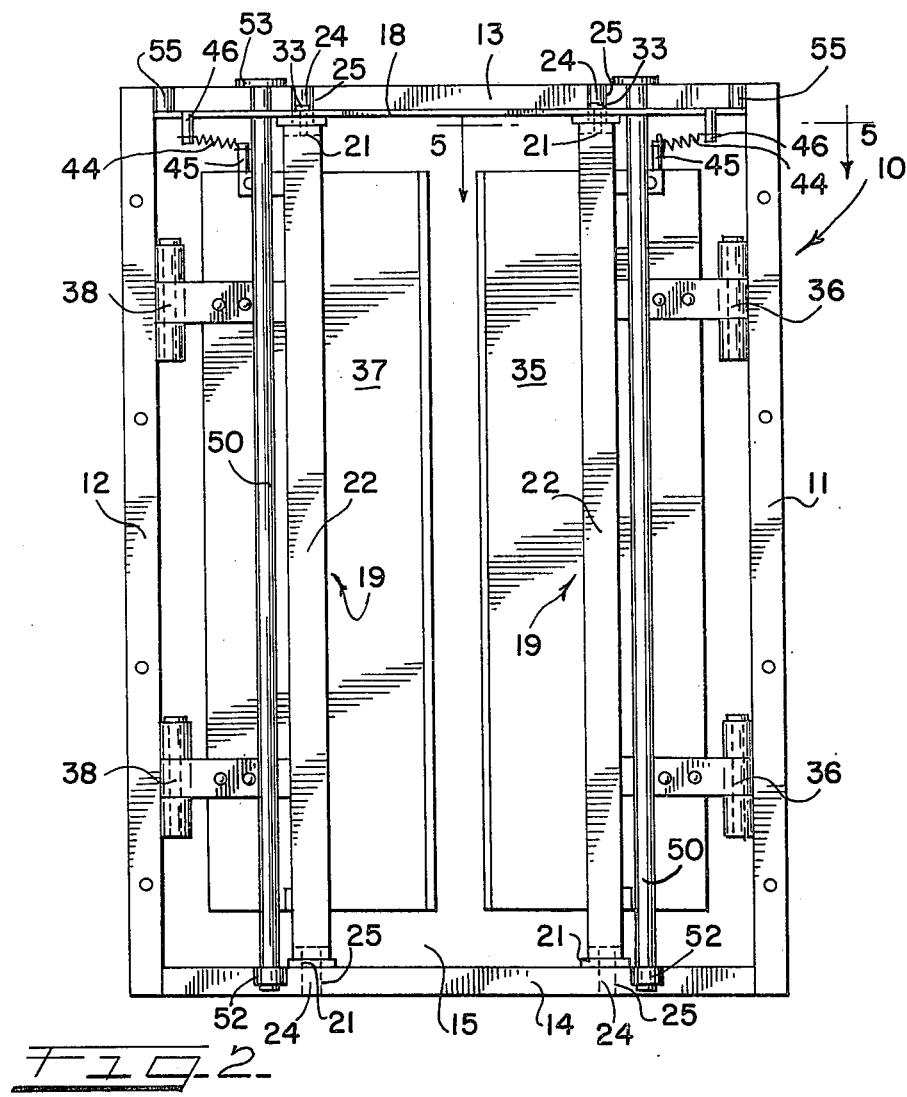
FIG. 2 is an elevational view of the gate, similar to FIG. 1, but with the width limiters in one of a range of positions.
Figure 4:
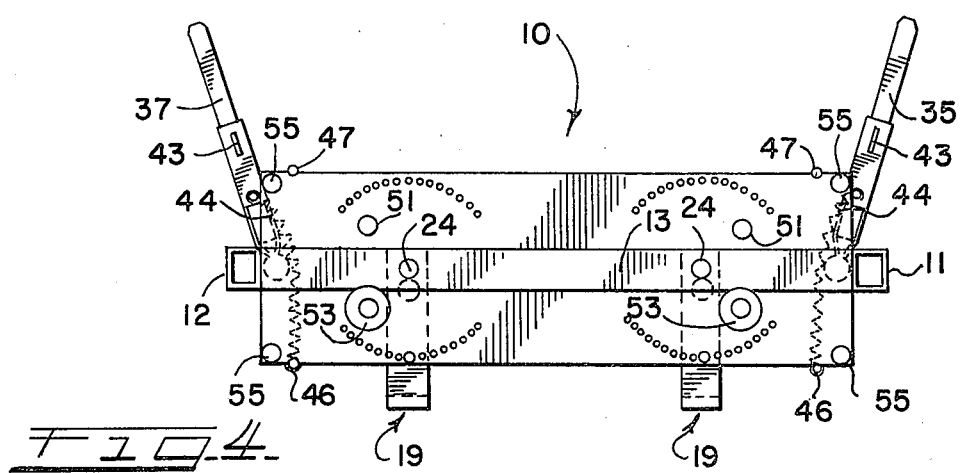
FIG. 4 is a top, plan view of the gate in FIG. 3, but with the doors retained in an open position.

Turning to FIG. 3, a plate 18 of approximately the same length as the upper horizontal frame member 13, underlies the member 13 with the plate 18 oriented in the horizontal plane. The plate 18 is attached to the underside of the member 13 by welding another suitable attachment means. However, the plate 18 is of greater width than member 13, with member 13 approximately centered with respect to the width of the plate 18.

A pair of width limiters generally designated 19 each have a pair of horizontally disposed arms 20. Vertically extending between a first pair of ends 21 of the arms 20 is a vertical rail 22. The arms 20 and the vertical rail 22 of each width limiter 19 can be fabricated from metal bar stock.

Near a second pair of ends 23 of the arms 20 is provided a pin 24 projecting outwardly from the arms 20. The pins 24 projecting outwardly from each of the arms 20 are received within a bore 25. A pair of bores 25 are provided in the upper frame member 13 and in the lower frame member 14 at spaced intervals along the members 13, 14. The bores 25 in the upper frame member 13 also extend through plate 18 and are axially aligned with the bores 25 in the lower frame member 14.

The combination of the bores 25 and the pins 24 on the arms 20 of the width limiters 19 provide the pivoting means for independently pivoting each of the width limiters 19 with respect to the horizontally disposed frame members 13, 14.

To reduce friction and rubbing between the arms 20 of the width limiters 19, a spacer means is preferably employed between the arms 20 and the lower frame member 14 about the pin 24. Spacer means may also be employed between the arms 20 and the plate 18 about the pins 24. A flat washer 27 with a sufficiently large inside diameter to fit about the pin 24 comprises a suitable spacer means.

According to one aspect of the invention, there is provided a means for fixing each of the width limiters 19 in one of a range of operating positions such that only animals of less than a predetermined size are capable of passing through the gate 10. The horizontal spacing between the vertical rails 22 of the width limiters 19 determines the size of animals which will be able to pass through gate 10. In the top view of FIG. 3, the width limiters 19 are turned or pivoted to an operating position. Centered about the bores 25 on both sides of the upper frame member 13 are a plurality of apertures through the plate 18. The apertures 30 are arranged in circular arcs with the apertures 30 at spaced intervals along the arc.

At least one aperture 31 is provided in an upper arm 20 of the width limiters 19. The aperture 31 in the upper arm 20 is an equal radial distance from the bore 25 as the plurality of apertures 30 and the plate 18 such that aperture 31 is axially alignable with one of the apertures 30. Because the upper arm 20 of the width limiters 19 is in close proximity to the plate 18, an insertable means such as a pin 33 in FIG. 3 may be inserted through one of the apertures 30 in the plate 18 down through the aperture 31 in the upper arm 20 of the width limiters 19, thereby selectively fixing the width limiters 19 in one of a range of selective operating positions.

To further increase the range of operating positions to which the width limiters 19 may be fixed, the upper arm 20 of the width limiters 19 may be provided with a plurality of apertures 31 with the spacing between the apertures 31 being a fraction of the spacing between the plurality of apertures 30 and the plate 18 (FIG. 5). The fractional relationship in the spacing of the apertures 31 to that of the apertures 30 increases the number of operating positions into which the width limiters 19 may be fixed and also provides a finer adjustment of the space between the width limiters 19. Each aperture 30 may be marked to correspond to the associated spring between the limiters 19.

The bores through the horizontally disposed frame members 13, 14 are preferably located a distance of slightly less than the length of the arms 20 of the width limiters 19 from the ends of the horizontal frame members 13, 14. However, the bores 25 in each of the members 13, 14 are also preferably located approximately twice the length of the arms 20 of the width limiters 19 in a manner which permits the width limiters 19 to be rotated into a position whereat the width limiters 19 are generally co-planar with the frame of the gate 10. In this position, the vertical rails 22 are in close proximity to each other but do not contact each other. The width limiters 19 are shown pivoted in the co-planar relationship of FIG. 1, which is non-operating mode for the gate 10.

The spacing relationship of the bores 25 and the members 13, 14 to the length of the arms 20 of the width limiters 19 enables the width limiters 19 to be independently and simultaneously pivoted to new operating positions without any interference between the width limiters 19. Of course, the pin 33, FIGS. 2 and 3, must be removed before the width limiters can be pivoted to new operating positions. The spacing relationship of the bores 25 to the length of the arm 20 also permits the width limiters 19 to be easily reversed to an opposite operating position and further facilitates pivoting the width limiters 19 through a large angular displacement. The angular displacement may exceed 300 degrees. This provides a wide variety of spacing between the vertical rails 22 and the width limiters 19 such that a large range of sizes of animals may be accommodated by the gate 10 and the opening 15 through the gate 10 is efficiently used.

A door 35 is hingedly connected by hinges 36 to a vertical frame member 11. Another door 37 is hingedly connected by hinges 38 to the other vertical frame member 12. Each of the pair of doors 35, 37 span most of the space between the arms 20 of the width limiters 19 in the vertical direction. The doors 35, 37 also span most of the space between the rails 22 of the width limiters 19 when the doors 35, 37 and the width limiters 19 are in generally co-planar relationship with each other, as is illustrated in FIG. 1, and between the respective frame members 11, 12 to which the doors 35, 37 are hingedly connected. When the doors 35, 37 span the aforesaid area within the opening 15 of the gate 10, there exists a gap between the unconnected vertical edges 39, 40 the doors 35, 37 through which the width limiters 19 may be pivoted toward an opposite operating position without interferring with the doors 35, 37. The gap between the doors 35, 37 also provides limited visibility of whatever is on the other side of the gate 10 thereby stimulating the curiosity of the animals and further stimulating their desire to pass through the gate 10.

The doors 35, 37 may be fabricated from a variety of compositions including metals, wood, fiberglass. The edges 39, 40 of the doors are preferably rounded or beveled (FIG. 5) to minimize the discomfort to the animals passing through the doors 35, 37.

According to another aspect of the invention, stop means 42 are located on at least one of the arms 20 of the width limiters 19 near the second ends 23 thereof. The stop means 42 is in eccentric relationship to the pivoting means for the width limiters 19. Located along a horizontal edge of each of the doors 35, 37 is a doorstep 43. Due to the eccentric relationship of the stop means 42 to the pivoting pin 24 of the width limiters 19, the stop means 42 will pass by the doorstop 43 when the width limiters 19 are pivoted into a generally co-planar relationship with the doors 35, 37 as in FIG. 1. However, when the width limiters 19 are pivoted into an operating position such as in FIGS. 2 and 3, the door stops 43 on the doors 35, 37 will co-operate against the stop means 42 on the arms 20 of the width limiters 19 to permit the doors 35, 37 to open in only one direction. The sectional view of FIG. 5 illustrates the doorstop 43 on one of the doors 35 engaging the top means 42. Because the width limiters 19 can be fixed in one of a range of operating positions, as previously discussed, it is preferred that for good contact between the stop means 42 and the doorstop 43 that either the doorstop 43 or the stop means 42 have a rounded or accurate surface that comes into contact with the other. As shown in FIG. 5, the stop means 42 has a cylindrical surface which comes into contact with the flat surface of the doorstop 43. Thus, the width limiter 19 can be easily pivoted between various operating positions. When the width limiter 19 is pivoted into a generally co-planar relationship with the doors 35, 37 the eccentric relationship of the stop means 42 to the pivot pin 24 will enable the stop means 42 to pass by the doorstop 43 such that the width limiter 19 may continue to be pivoted toward an opposite operating position.

The doors 35, 37 are resiliently biased, as by a spring 44 such that the doorstop 43 on the doors 35, 37 will normally come to rest against the stop means 42 on the width limiters 19. A peg 45 extending upwardly from the top horizontal edge of the doors 35, 37 is used to secure one end of the spring 44. Other pegs 46 are located on the plate 18 near the corners thereof for securing the other end of the spring 44. When it is desired to reverse the direction of the flow through the gate 10, the spring 44 may be switched from the pegs 46 to pegs 47 along the opposite side of the plate 18 (FIG. 3) such that the doors 35, 37 are resiliently biased in an opposite direction and the doorstops 43 will contact the stop means 42 when the width limiters are pivoted to an opposite operating position.

Because of the eccentric relationship of the stop means 42 to the pivot pin 24 and the resilient biasing of the doors 35, 37 such that the doorstops 43 contact the stop means 42, the doors 35, 37 are normally held closed by the springs 44 in a position whereat the doors 35, 37 are both at a slight angle with respect to a plane defined by the frame members 11, 12, 13 14. That is, the doors 35, 37 are slightly biased toward the operating position of the width limiters 19 as can be seen in FIG. 3. This angular relationship is desirable because, while it does not interfere with passage of animals through the width limiters 19 thence through the doors 35, 37, the angular relationship makes it less probable that once an animal has passed through the gate 10 that it will be able to re-open the doors 35, 37 from the opposite side of the gate 10 by pawing, nudging or other efforts, regardless of animal size.

When the gate 10 is to be used for allowing passage of only small animals therethrough, the width limiters 19 will be turned to a position whereat the spacing between the vertical rails 22 correspond to the maximum width of animals desired, as previously discussed. In such operating modes, it may be possible for slightly larger animals to bypass the narrow spacing between the vertical rails 22 by attempting to pass between one of the vertical frame members 11, 12 and the nearest one of the vertical rails 22 because the spacing therebetween will be larger than the space between the vertical rails 22. A blocking means, such as vertically disposed bars 50 will prevent avoidance of the desired route of passage through the space between the vertical rails 22 of the width limiters 19. The bars 50 are received through apertures 51 in the plate 18 on either side of the upper horizontal frame members 13 and by rings 52 attached to the lower horizontal frame member 14 (FIGS. 1 – 4). The apertures 51 in the plate 18 are located near the frame member 13 such that a larger diameter head portion 53 at the upper end of the bar 50 will support the bar 50 by engaging the top edge of the horizontally disposed frame member 13. The apertures 51 and the rings 52 are located on both sides of the respective horizontally disposed frame members 13, 14. Thus the blocking bars 50 may be inserted into the gate along either side of the doors 35, 37. If the blocking bars 50 are inserted on the sides of the doors 35, 37 opposite to the width limiters 19, passage through the gate 10 in either direction is prevented. When the width limiters are used with small spaces therebetween, the blocking bars 50 will be used on the same side of the gate 10 to which the width limiters 19 are turned such that the doors 35, 37 may open in the desired direction to allow passage of animals through the gate 10.

When the gate 10 is used to permit passage of larger animals therethrough, the width limiters 19 will be in an operating position whereat passage between one of the vertical rails and one of the vertical members 11, 12 will not be a problem. The blocking bars 50 may then be removed to permit the width limiters 19 to be pivoted for larger spacing therebetween. As presented above, the vertical frame members 11, 12 are preferably of hollow tubular metal. Thus, the blocking bars 50 may be stored in the vertical frame members 11, 12 when not in use.

Passage through the gate 10 in either direction of animals below a predetermined size may be desired in some applications or uses of the gate 10. To facilitate this operating mode, the doors 35, 37 may be held open by a suitable retaining means, as in FIG. 4. A tubular segment 55 is provided at each of the corners of the plate 18. A pin or the like (not shown) may be inserted into the tubular segment 55 to extend downwardly and engage the doors 35, 37 to hold doors 35, 37 in the position of FIG. 4. Animals capable of passing between the width limiters 19 will then be able to pass through the gate 10 in either direction.

An animal size sorting and control gate which is operable in a variety of modes and is easily reversible for animal flow in an opposite direction has been presented in the above-disclosed preferred embodiment. It will be apparent to those skilled in the art that the principles disclosed in the preferred embodiment could also be utilized in a single door version, such as that illustrated in FIGS. 6 and 7.

Similar to the double-door gate 10, the single-door gate 110 has a first vertically disposed frame member 111 and a second vertically disposed frame member 112, an upper horizontally disposed frame member 113 and a lower horizontally disposed frame member 114. A door 135 is hingedly connected to the first frame member 11. A width limiter 119 has horizontally disposed arms 120 with a vertically disposed rail 122 therebetween. The width limiter 119 has pivot pins 124 near first ends of the arms 120 for pivoting the width limiter 119 with respect to the horizontally disposed frame members 113, 114. A spacer means 127 may be interposed between the arms 120 and the frame members 113, 114 for providing operational clearance between the width limiter 119 and the frame horizontally disposed frame members 113, 114. A plurality of apertures 130 through a plate 118 are arranged in circular arcs about a bore 125 of the pivot means for selectively positioning the width limiter 119 in one of a range of operating positions. The bores 125 extending through the frame members 113, 114 are positioned theralong to enable the width limiter 119 to pass between the door 135 and the second vertically disposed frame member 112 without interference from either. Also, the stop means 142 on the arms 120 is in eccentric relationship to the pivot pin 124 thereby permitting the stop means 142 to pass by the doorstop 143 on the door 135 when width limiter 119 is pivoted into a position whereat the width limiter 119 is generally co-planar with the door 135, but to engage the doorstop 143 when the width limiter is in an operating position. A blocking bar 150 is received within an aperture 151 through the plate 118 on either side of the upper frame member 113 at a point between the bore 125 and the first vertical frame member 111. The blocking bar 150 is received in a ring 152 at the lower frame member 114. The doorstop 143 is normally biased against the stop means 142 by a spring 144 connected between a peg 145 on the door 135 and a peg 146 located along an edge of the plate 118.

The major operational difference between the double-door gate 10 and the single-door gate 110 is that the size of animals capable of passing therethrough is determined by the spacing between the vertical rail 122 of the width limiter 119 and the second vertical frame member 112, rather than between the pair of vertical rails 22 of the width limiters 19 in the double-door gate 10. If the door 135 of the gate 110 is the same size as the door 35 of the gate 10 it will readily be appreciated that the single-door gate 110 has only half the width capability of the double-door gate 10. However, the single-door gate 110 otherwise retains the versitility of numerous operating modes and the other advantages flowing from the teachings of the invention.

It will be understood that various changes and modifications may be made without departing from the spirit of the invention as defined in the following claims, and equivalents thereof.

I Claim:

1. An animal size sorting and control gate comprising:
   a pair of vertically disposed frame members including a first frame member and a second frame member;
   a pair of horizontally disposed frame members including an upper frame member and a lower frame member, said vertically disposed and horizontally disposed frame members connected together near ends thereof to define a generally rectangular opening therebetween;
   a pair of width limiters, each of said width limiters having a pair of horizontally disposed arms and a vertical rail extending between a first pair of end of said arms;
   pivoting means near a second pair of ends of said arms for independently pivoting each of said width limiters with respect to said horizontally disposed frame members;
   means for fixing each of said width limiters in one of a range of operating positions such that the maximum width of animals capable of passing through said gate is determined by the spacing between the vertical rail of the width limiters;
   stop means on at least one of said pair of arms of each width limiters near said second pair of ends thereof, said stop means in eccentric relationship to said pivoting means;

a first door hingedly connected to said first frame member;

a second door hingedly connected to said second frame member;

resilient means to urge said first door and said second door toward normally closed positions;

edge means along at least one horizontal edge of both said first door and said second door, said edge means positioned along said edge such that said edge means will co-operate against said stop means to permit said first door and said second door to open in only one direction when said pair of width limiters are each fixed in one of a range of operating positions, but will allow said stop means to pass by said edge means when said width limiters are pivoted to a position whereat said width limiters are generally co-planar with said first door and said second door thereby permitting said width limiters to be further pivoted toward an opposite operating position whereat said first door and said second door open in only an opposite direction, thereby reversing the direction of flow of animals through said gate.

2. The size sorting and control gate of claim 1 wherein said first door and said second door span most of the area in the vertical direction between said pair of arms of said width limiters, and in said horizontal direction between said vertically disposed frame members and the vertical rail of said width limiters, when said width limiters are pivoted into a generally co-planar relationship with said first door and said second door.

3. The size sorting and control gate of claim 1 wherein said means for fixing the width limiters in one of a range of operating positions comprises plate means horizontally disposed in proximity to an arm of each of said width limiters; a plurality of apertures in said plate means with said apertures arranged in a circular arc at spaced intervals along the arc, said arc centered about said pivoting means; at least one aperture through each arm of said width limiters in proximate relation to said plate mans at a point such that the aperture in each of said arms is alignable with the apertures in said arc; and insertable means extending between one of the apertures in said arc and the aperture in each of said arms to fix the operating position of said width limiters.

4. The size sorting and control gate of claim 3 wherein a plurality of apertures are provided in each arm of said width limiters in proximate relation to said plate means, with the spacing of said plurality of apertures in said arms being fractional portions of the spacing intervals between the apertures of the arc thereby increasing the range of selectable operating positions of said width limiters.

5. The size sorting and control gate of claim 1 further comprising blocking means; and means for receiving said blocking means at positions intermediate to said pivoting means and an adjacent vertical frame member, said blocking means being further disposed along sides of the first door and the second door when said doors are in a closed position, said blocking means being inserted in said receiving means only along the side of the first door and of the second door which will not interfere with movement of the doors in the desired direction of animal flow therebetween.

6. The size sorting and control gate of claim 5 wherein said blocking means is insertable into and removable from said receiving means, said blocking means is inserted into said receiving means for blocking passage of small animals through said gate except between said width limiters when said width limiters are fixed in an operating position with a small space between the vertical rails thereof, and said blocking means is removable from said receiving means for allowing large animals to pass through said gate when said width limiters are fixed in operating position with a large space between said vertical rails.

7. The size sorting and control gate of claim 5 wherein said blocking means are insertable into said receiving means on both sides of said doors when said doors are in closed positions to prevent passage of animals through said gate in either direction.

8. The size sorting and control gate of claim 1 wherein said pivoting means comprises a pair of bores in axial alignment, one of said bores in each of said upper and lower horizontally disposed frame members and a pair of pins, one projecting outwardly from each of the arms of said width limiters for pivotal cooperation with said bores.

9. The size sorting and control gate of claim 8 wherein said pivoting means further comprises spacer means about said pins for providing clearance between the horizontally disposed frame members and the arms of the said width limiters.

10. The size sorting and control gate of claim 9 wherein said spacer means comprises a flat washer.

11. The size sorting and control gate of claim 1 further comprising retaining means to hold said doors in an open position to permit animals of sufficiently small size to pass between said limiters in either direction of flow through said gate.

12. An animal size sorting and control gate comprising:

a pair of vertically disposed frame members including a first frame member and a second frame member;

a pair of horizontally disposed frame members including an upper frame member and a lower frame member, said vertically disposed and horizontally disposed frame members connected together near ends thereof to define a rectangular opening therebetween;

a width limiter having a pair of horizontally disposed arms and a verical rail extending between a first pair of ends of said arms;

pivoting means near a second pair of ends of said arms for pivoting said width limiters with respect to horizontally disposed frame members;

means for fixing the width limiter in one of a range of operating positions such that the maximum width of animals capable of passing through said gate is determined by the spacing between the vertical rail of said width limiter and the second frame member;

stop means on at least one of said pair of arms near said second pair of ends thereof, said stop means in eccentric relationship to said pivoting means;

a door hingedly connected to said first frame member;

resilient means to urge the door toward a normally closed position;

edge means along at least one horizontal edge of said door, said edge means positioned along said edge such that said edge means will cooperate against said stop means to permit the door to open in only one direction when said width limiter is fixed in one of a range of operating positions, but will allow said stop means to pass by said edge means when said width limiter is pivoted to a position whereat said width limiter is generally co-planar with said door, thereby permitting said width limiter to be further pivoted to an opposite operating position whereat said door opens only in an opposite direction thereby reversing the direction of flow of animals through said gate.

* * * * *